Dec. 15, 1970   A. N. MANGUM ETAL   3,547,601
GIMBAL SYSTEM AND METHOD OF ASSEMBLING
Filed April 15, 1968   3 Sheets-Sheet 1
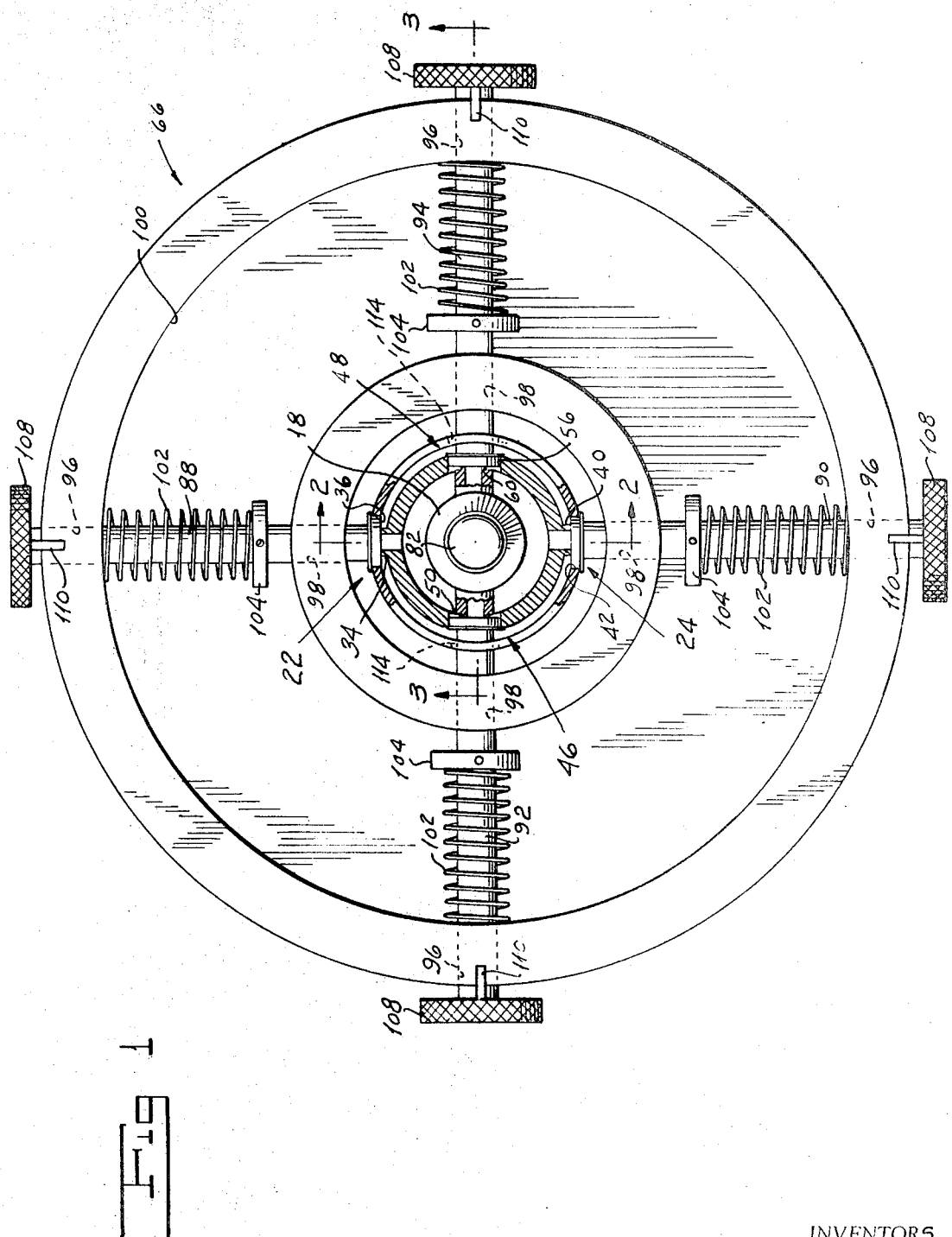
INVENTORS
Andrew N. Mangum
Wallace R. Hyde
BY
Chenier & O'Connor
ATTORNEYS

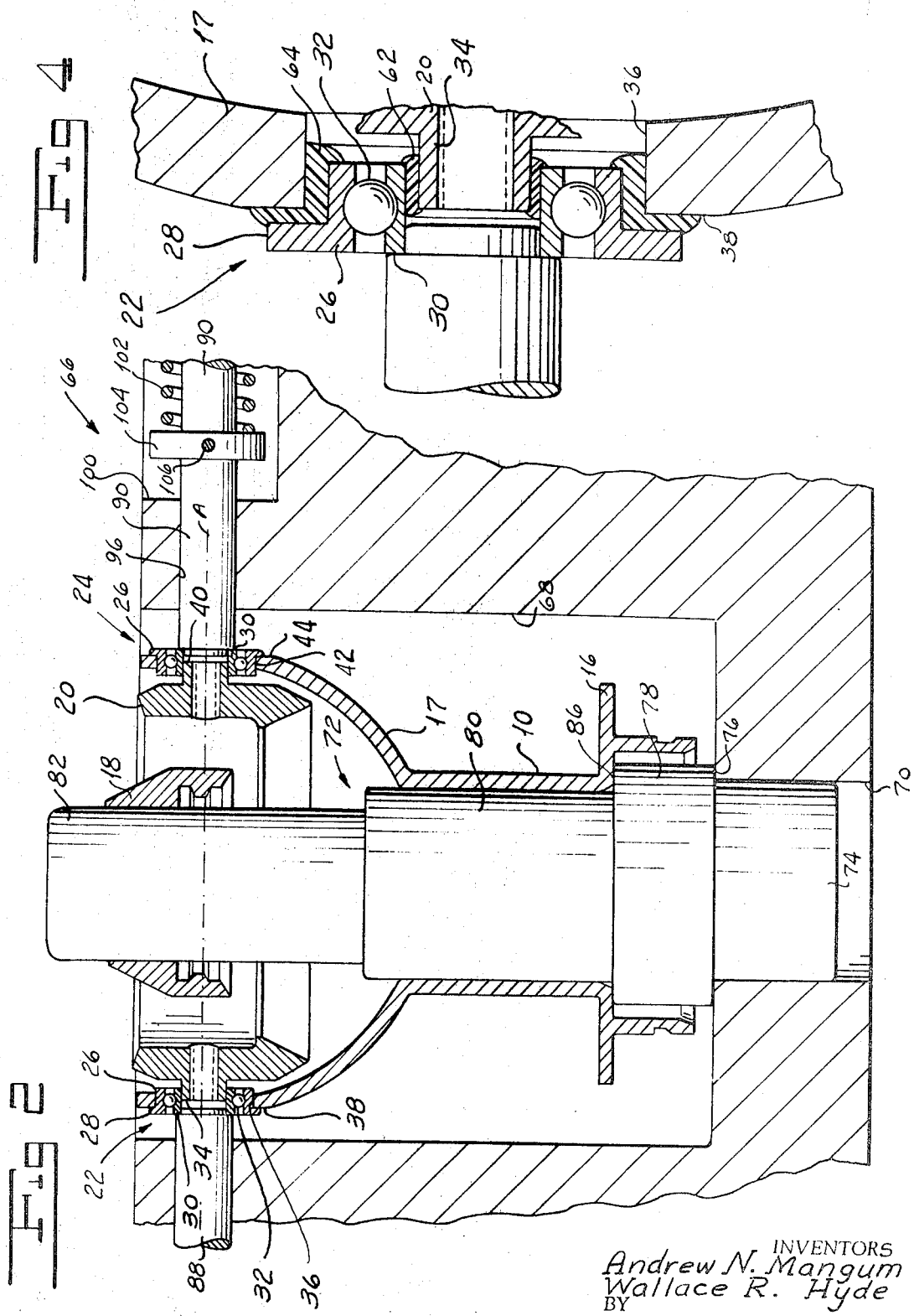

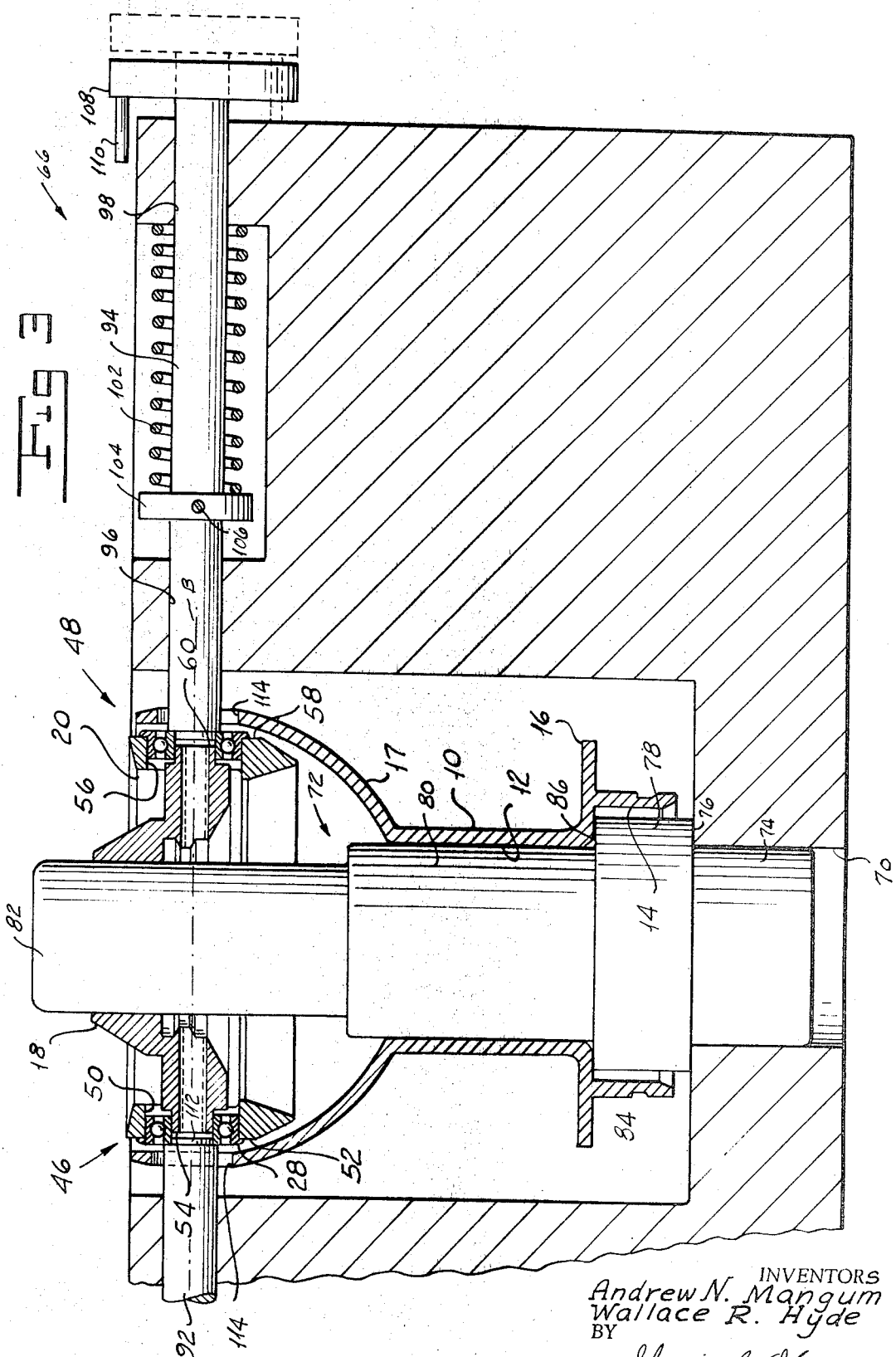

United States Patent Office 3,547,601
Patented Dec. 15, 1970

3,547,601
GIMBAL SYSTEM AND METHOD
OF ASSEMBLING
Andrew N. Mangum, Orange, and Wallace R. Hyde,
Devon, Conn., assignors to United Aircraft Corporation, East Hartford, Conn., a corporation of Delaware
Filed Apr. 15, 1968, Ser. No. 721,505
Int. Cl. B23p *11/00, 19/04*
U.S. Cl. 29—148.4                       19 Claims

ABSTRACT OF THE DISCLOSURE

A method of assembling a gimbal system in which the inner gimbal and the outer gimbal are positioned by a fixture in precise axial alignment along a first axis and in which means on the fixture locates and applies predetermined loading forces to the respective inner and other gimbal bearings while floating in a bonding agent along coplanar axes which are precisely mutually perpendicular to each other and to the first axis, and the bonding agent then is cured.

BACKGROUND OF THE INVENTION

In the prior art gyroscope assemblies include gimbal systems wherein an outer gimbal is supported on a housing for pivotal movement around a first axis and wherein an inner gimbal is supported on the outer gimbal for pivotal movement around a second axis which is coplanar with and perpendicular to the first. If the system is to function properly, the first and second axes must be precisely mutually perpendicular and coplanar and the inner and outer gimbals must be aligned with a third axis which is mutually perpendicular to each of the first two axes. These criteria are relatively difficult to meet in the case of any gyroscope assembly and they become particularly severe in the case of miniature gyroscopes.

In an attempt to provide assemblies of the type described above in the prior art, all of the parts of the gimbal system are held to extremely close tolerances. That is, bores and journals, diameter, taper, roundness and surface finish all must be closely controlled. Moreover, many parts must be match machined and matched or coded bearings are employed to ensure the proper fit. In assembly of the parts, shims to ensure proper spacing of the parts are initially selected on a relatively complex gauging mechanism. During assembly, shims often must be changed to ensure correct alignment of the axis of a gimbal. It will readily be appreciated that this complex assembly operation requires appreciable handling of the parts which leads to contamination of the gimbal bearings. The tight bearing fits resulting from the close tolerances are conducive to damage to the bearings. Combined with any slight taper or out-of-roundness, the tight bearing fits cause distorted bearing races. The distorted bearing races do not seat properly so that full ball contact is not achieved. It may also result that the gimbals themselves are distorted. The magnitude of the problem of providing a precise gimbal system, particularly in a miniature assembly, will readily be appreciated.

We have invented a gimbal system and method of assembling the same which overcomes many of the defects of methods and assemblies of the prior art pointed out hereinabove. Our arrangement opens up substantially all bearing fits, thus reducing tolerances, eliminating shims and screws and eliminating the necessity for matching parts and bearing fits. It greatly simplifies the skill required to perform the assembling operation. It reduces the time required to complete an assembly. Consequently it results in an assembly which is less expensive to produce than are those produced by methods of the prior art. More particularly, our method permits two parts to be assembled for rotation about respective axes which have a precise angular relationship. It further permits two parts to be assembled for rotation about respective axes, the distance between which is precisely controlled.

SUMMARY OF THE INVENTION

One object of our invention is to provide a method for assembling two members for relative rotation around respective axes having a precise angular relationship in a rapid and expeditious manner.

Another object of our invention is to provide a method for assembling two parts for rotation around respective centers, the distance between which is precisely controlled in a rapid and expeditious manner.

A further object of our invention is to provide a method for assembling a gimbal system which overcomes the defects of methods of the prior art.

Still another object of our invention is to provide a method of assembling a gimbal system which does not require precise machining or close tolerances.

Still another object of our invention is to provide a method of assembling a gimbal system which does not require the use of shims or screws.

A still further object of our invention is to provide a method of assembling a gimbal system which is simpler and more expeditiously performed than are methods of the prior art.

Yet another object of our invention is to provide a gimbal system which is simpler and which is less expensive to construct than are gimbal systems of the prior art.

A still further object of our invention is to provide a fixture for precisely assembling a gimbal system in a rapid and expeditious manner.

Other and further objects of our invention will appear from the following description.

In general our invention contemplates the provision of a method of assembling a gimbal system in which the housing and the inner and outer gimbal rings, provided with bearings which are floating in an uncured bonding agent, are placed on a fixture which precisely aligns the inner and outer gimbal with a first axis and which locates and applies predetermined loading forces to the inner and outer gimbal ring bearings along respective axes which are precisely coplanar and which are precisely mutually perpendicular with each other and with the first axis. While the assembly is in the fixture, the bonding agent is set.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a top plan view of our gimbal system located in our assembly fixture with parts broken away.

FIG. 2 is a fragmentary sectional view of the gimbal system and fixture shown in FIG. 1 taken along the line 2—2 of FIG. 1 and drawn on an enlarged scale.

FIG. 3 is a fragmentary sectional view of the gimbal system and fixture shown in FIG. 1 taken along the line 3—3 of FIG. 1 and drawn on an enlarged scale.

FIG. 4 is a fragmentary sectional view of one of the bearings of the gimbal system shown in FIG. 1.

DESCRIPTION OF THE PREFERRED
EMBODIMENT

Referring now to the drawings, our gimbal system includes a housing 10 having a bore 12 with an enlarged portion 14 at the lower end thereof, as viewed in the figures. We provide our housing 10 with a positioning flange 16 at the point at which enlargement 14 joins the bore 12. The upper portion 17 of the housing 10 is generally hemispherical and is adapted to receive the assembly of the inner gimbal 18 and of the outer gimbal 20. Respective ball bearings, indicated by the reference characters 22 and 24, are adapted to support the outer gimbal 20 for rotary movement around a first axis A with relation to the housing 10. Bearing 22 has an outer ring 26 provided with a peripheral flange 28, an inner ring 30 and balls 32 disposed in the raceways between the rings 26 and 30. In a manner to be described, the inner ring 30 is assembled on a journal 34 on the outer gimbal 20 and the outer ring 26 is assembled in an opening 36 in the upper portion 17 of housing 10 with flange 28 adjacent a flat machined surface 38 on the upper portion 17 of housing 10.

Since the parts of the bearing 24 are similar to those of the bearing 22, they will not be described in detail. As will be more fully described hereinafter, the inner ring 30 of the bearing 24 is assembled on a journal 40 on the outer gimbal 20 at a location diametrically opposite the journal 34. Outer ring 26 of bearing 24 is assembled in an opening 42 in the upper portion 17 of housing 10 opposite the opening 36 with the outer ring flange 28 of bearing 24 adjacent a flat outer surface 44 provided on the upper portion 17 of the housing 10.

We provide respective bearings 46 and 48 similar to bearings 22 and 24 for supporting the inner gimbal 18 on the outer gimbal 20 for rotary movement with relation thereto around an axis B, which is perpendicular to and which is coplanar with the axis A around which the outer gimbal moves. The outer ring 26 of bearing 46 is secured in an opening 50 in the gimbal 20 with the outer ring flange 28 of bearing 46 adjacent a flat outer surface 52 on the gimbal 20. The inner ring 30 of the bearing 46 receives a journal 54 on the inner gimbal 18.

The outer ring of bearing 48 is secured in an opening 56 in the gimbal 20 at a location diametrically opposite the opening 50 with the outer ring flange 28 of bearing 48 adjacent a flat outer surface 58 provided on the gimbal 20. The inner ring 30 of bearing 48 receives a journal 60 on the gimbal 18 at a location opposite the journal 54.

In the prior art in assembling the parts thus far described, the various accurate machining operations, matched fits, shims, screws and the like described above, were required to be employed. We so assemble the parts just described as to avoid the necessity for these expedients.

Referring to FIG. 4, we have shown the bearing 22, the outer ring 26 of which is to be assembled in the opening 36 in the spherical housing portion 17 and the inner ring 30 of which is to receive the journal 34 of the outer gimbal 20. In assembling these parts, we deposit an uncured bonding agent 62, which is adapted to be cured or set in a manner to be described, between the journal 34 and the bore of the inner ring 30. Similarly, we deposit uncured bonding agent 64 between the outer surface of the outer ring 26 and the flange 28 and the opening 36 and the flat outer surface 38 on the housing portion 17. We deposit the uncured bonding agent between the rings of the other bearings and the openings in which they are received or the journals which they receive. We may employ any suitable material as the bonding agent. Preferably, we employ a material such as an epoxy resin which, when cured, will provide a secure bond between the mating parts.

Having assembled the parts of the system with the uncured resin, we next place the assembly in a fixture, indicated generally by the reference character 66. The fixture 66 has a central opening 68 provided with a bore 70 at the bottom of the opening for receiving a locating pin or post, indicated generally by the reference character 72. The lower end 74 of the locating pin 72 is received in the bore 70 so that a shoulder 76 formed by an enlarged portion 78 of the pin rests on the bottom of the recess 68. Above the portion 78 of the pin 72 is a gimbal housing centering pin portion 80 having a diameter equal to the inside diameter of the cylindrical portion of the housing 10. Above the portion 80 of pin 72 we provide a gimbal receiving pin portion 82 having a diameter which is equal to the inside dameter of the inner gimbal 18.

When the gimbal system which has been assembled with the uncured resin deposits is placed in the fixture 66, the upper end of the enlarged gimbal housing portion 84 rests on the surface 86 between the pin portions 78 and 80. At the same time the pin portion 80 extends through the cylindrical portion of the housing 10 so as accurately to center the housing in the fixture. The pin portion 82 extends through the inner gimbal 18 so as accurately to center that gimbal with respect to the housing 10. In this manner we ensure that the gimbal system is accurately centered in the housing 10.

The fixture 66 includes four respective bearing locating and loading rods 88, 90, 92 and 94. Each of the rods is mounted for sliding movement in a pair of spaced bores 96 and 98 formed in the body of the fixture 66. We so form opposite pairs of bores as to be precisely coaxial. Moreover, the common axis of one set of oposite pairs of bores is precisely perpendicular to the common axis of the pairs of bores of the other set. In addition, where the fixture is intended for use in assembling a gyroscope gimbal system, both the axes are precisely coplanar.

Each of the rods 88, 90, 92 and 94 extends through an open annular recess 100 in the top of the body of the fixture 66 between the bores 96 and 98. Respective springs 102 associated with the rods bear between the outer edge of the recess 100 and collars 104 secured to the rods by any suitable means such as by setscrews 106. Springs 102 normally urge the rods radially inwardly toward the fixture recess 68. We provide each of the rods with a knob 108 carrying a pin 110 extending from the knob in the same direction as does the rod. When it is desired to move a rod, such as the rod 94, to inoperative position, it can be extracted against the action of its associated spring 102 and rotated to a position at which, upon release of the knob, the pin 110 rests against the outer surface of the fixture. This position of the parts is illustrated in broken lines in FIG. 3. When a rod, such as the rod 94, is to be moved to operative position, the knob 108 is rotated until the pin 110 is located over the top of the fixture and the rod is released.

From the description thus far, it will be seen that in assembling the gimbal system, we deposit an uncured bonding agent such, for example, as an epoxy resin, between all of the bearing rings and the parts with which they are to mate. Having done this and with all of the rods 88, 90, 92 and 94 in their inopertaive positions, we slip the assembly onto the locating pin 72 in the recess 68 of the fixture until it is supported on the surface 86. The surface 86 is accurately machined so that it is precisely parallel to the plane in which the common axes of opposite sets of rods 84 lie. Surface 86, moreover, is located at a position along the length of the pin 72 such that with the assembled gimbal system in the fixture, the gimbal bearings are so located as to be accessible to the rods 88, 90, 92 and 94. Pin 82 itself is so disposed and is so machined that the central axis of the pin precisely passes through the point of intersection of the axes of opposite pairs of the loading rods. Owing to that fact, when the gimbal assembly is in the fixture, the housing 10 and the inner gimbal 18 are coaxial on an axis which passes through the point of intersection of the axes of opposite pairs of loading rods.

With the parts in the position just described, all of the loading rods are moved from their inoperative positions to their operative positions. We provide the housing portion 17 with openings 114 which permit access of the rods 92 and 94 to the bearings 46 and 48. In the operative positions of the rods, reduced end tips 112 on the respective rods 88, 90, 92 and 94 enter the inner rings 30 of the respective bearings 22, 24, 46 and 48. With the gimbal assembly having the deposits of uncured resin thereon located in the fixture 66, all of the bearings float in the resin. With all of the rods in the operative positions just described, each rod, owing to the engagement of its locating boss 112 in the inner ring of the associated bearing, accurately centers that bearing on the rod axis. In addition, the loading force provided by the rod acts on the inner ring and through the balls on the outer ring. This force tends to squeeze the resin outwardly from between the outer ring flange 28 and the machined surface such, for example, as surface 38, toward which the flange is pushed. The resultant axial clearance between the flange and the machined surface is a function of the magnitude of the force and of the viscosity of the resin used. A relatively large force and a low viscosity tends to squeeze out more of the resin so as to reduce its axial clearance. However, it does permit tolerance on the perpendicularity of the machined surface to the axis of the rod. We may provide any suitable loading force such, for example, as a force of one pound. While we have shown springs acting on the rods 88, 90, 92 and 94 to provide the loading force we might use other means, such as a hydraulic or pneumatic system to ensure a uniform load on all bearings.

As a result of the actions just described, each bearing is centered on the axis of its associated rod and is constrained to rotate around that axis. Consequently, the bearings of an opposite pair are accurately caused to rotate around the common axis of opposite rods. Since the respective axes of opposite pairs of rods are accurately perpendicular, the axes of rotation of the respective inner and outer gimbals are accurately perpendicular. Since the plane of the axes of opposite pairs of rods is accurately perpendicular to the axis of the locating pin 72, the vertical axis of the housing 10 will be perpendicular to this plane and to both of the axes lying therein. Thus, all of the conditions for accurate operation of the gyroscope have been met without the necessity of accurate machining, matched fits, shims, screws and the like.

With the gimbal assembly in the fixture 66 as described above, the resin is set. For example, where the resin is an epoxy resin, it can be set by allowing it to stand for a relatively long period of time. If it is desired, setting of the epoxy can be accelerated by baking the entire unit at an elevated temperature for a shorter period of time, as is known in the art. It is to be understood that, while we have described our method as including the step of applying the epoxy before the assembly is placed in the fixture, it may be possible to inject the resin while the assembly is in the fixture.

In performing our method of assembling gimbal systems, we first assemble the inner gimbal 18 on the outer gimbal 20 by placing epoxy between the outer rings of bearings 46 and 48 and the openings 50 and 56 between the outer ring flanges and surfaces 52 and 58 and by placing epoxy between the inner rings of the bearings and the journals 54 and 60. We assemble the outer gimbal 20 on the housing portion 17 by depositing epoxy between the outer rings of bearings 22 and 24 and the openings 36 and 42 and between the outer ring flanges and the surfaces 38 and 44. We also deposit epoxy between the inner rings of bearings 22 and 24 and the respective journals 34 and 40.

We next place the assembly in the fixture recess 68 by slipping the assembly over the pin 72 until it rests on the surface 86. We so dispose the parts that the respective bearings 22 and 24 are roughly aligned with rods 88 and 90 and bearings 46 and 48 are adjacent the rods 92 and 94. With the system thus in position, we move all of the rods 88, 90, 92 and 94 to their operative positions to cause their respective locating bosses 112 to enter the inner rings of bearings 22, 24, 46 and 48. In this position of the parts, all of the elements are accurately located. The housing 10 and the inner gimbal 18 are accurately centered on a common axis, which is the axis of pin 72, and the pairs of bearings 22 and 24 are accurately aligned with respective mutually perpendicular axes, which are located in a plane which is perpendicular to the axis with which gimbal 18 and housing 10 are aligned. Next, the epoxy is set and after setting, the rods are moved to inoperative positions and the finished assembly is removed.

While we have described our method in connection with a gyroscope gimbal system wherein the gimbal axes are to be coplanar, it will readily be appreciated that it is equally applicable to a system wherein two axes are to be located in planes which are accurately spaced. Moreover, while the axes of our system are mutually perpendicular, we might as well provide an arrangement wherein any predetermined accurate angular arrangement other than perpendicular is desired.

It will be seen that we have accomplished the objects of our invention. We have provided a method of assembling a gyroscope system which overcomes the defects of methods of the prior art. Our method does away with the need for employing extremely accurately machined parts, matched fits, shims and screws. It is simpler and more expeditiously performed than are methods of the prior art. It results in an assembly which is less expensive than are assemblies of the prior art.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A method of assembling a system for supporting a body for movement around two axes positioned at a predetermined nonparallel angular relationship including the steps of mounting an intermediate member on a first bearing carried by a support while permitting movement of said bearing relative to said support, mounting said body on a second bearing carried by said intermediate member while permitting movement of said second bearing relative to said intermediate member, precisely centering said first bearing in axial alignment with one of said axes, concomitantly precisely centering said second bearing in axial alignment with the other of said axes and then securing said first and second bearings to said support and to said intermediate member while so centered.

2. A method as in claim 1 in which said axes are coplanar.

3. A method as in claim 1 in which said securing step comprises bonding said bearings to said support and to said intermediate member.

4. A method as in claim 1 including loading said bearings respectively along the directions of said axes.

5. A method as in claim 1 including loading said bearings respectively along the directions of said axes and in which said securing step comprises bonding said first and second bearings respectively to said support and to said intermediate member.

6. A method as in claim 1 in which said axes have a point of intersection and including the step of aligning said support and said body with a third axis passing through said point before performing said securing step, said third axis having a predetermined angular relationship with said first and second axes.

7. A method of assembling a system as in claim 1 including the step of depositing an uncured bonding agent between said first bearing and said support and between said second bearing and said intermediate member before performing said securing step.

8. A method of assembling a system for supporting a body for movement around two axes having a predetermined angular relationship including the steps of mounting an intermediate member on a pair of spaced bearings carried by a support while permitting movement of said bearings relative to said support, mounting said body on a second pair of spaced bearings carried by said intermediate member while permitting movement of the bearings of said second set relative to said intermedaite member, precisely centering the bearings of said first set coaxially with one of said axes, precisely centering the bearings of said second set coaxially with the other axis and then securing the bearings of said first and second pairs respectively to said support and to said intermediate member.

9. A method as in claim 8 in which said securing step comprises depositing an uncured bonding agent between the bearings of said first set and said support and between the bearings of the second set and said intermediate member and curing said resin while said bearings are so centered and so aligned.

10. A method of assembling a gimbal system having a support, an outer gimbal, bearings for mounting said outer gimbal on said support, an inner gimbal and bearings for mounting said inner gimbal on said outer gimbal including the steps of precisely positioning the respective inner gimbal bearings and outer gimbal bearings in axial alignment with mutually perpendicular axes, securing said outer gimbal bearings to said outer gimbal and said support and securing said inner gimbal bearings to said inner gimbal and to said outer gimbal.

11. A method as in claim 10 in which said mutually perpendicular axes are coplanar.

12. A method as in claim 10 including loading said bearings during said positioning step.

13. A method as in claim 10 including the step of precisely positioning said inner and outer gimbals in axial alignment.

14. A method as in claim 10 including the step of precisely positioning said inner and outer gimbals in axial alignment with a third axis mutually perpendicular to said inner and outer gimbal bearing axes.

15. A method as in claim 10 in which said positioning step comprises floating said inner gimbal bearings on an uncured bonding agent during said positioning step and curing said resin after said positioning step.

16. A method of assembling a gimbal system having a housing provided with oppositely disposed bearing openings, an outer gimbal provided with oppositely disposed bearing openings and provided with oppositely extending journals, an inner gimbal provided with oppositely extending journals, a first pair of bearings for supporting said outer ring on said housing and a second pair of bearings for supporting said inner gimbal on said outer gimbal, each of said bearings having an inner ring and having an outer ring provided with a peripheral flange including the step of assembling said outer gimbal on said housing with outer rings of the bearings of said first pair in said housing bearing openings and with said outer gimbal journals in the inner rings of the bearings of the first pair, assembling said inner gimbal on said outer gimbal with the outer rings of the bearings of the second pair in the outer gimbal bearing openings and with the journals of the inner gimbal in the inner rings of the bearings of the second pair, depositing uncured bonding agent in the housing openings receiving the outer rings of the first pair and between the outer ring flanges of the first pair and the surface of said housing around said openings and between the inner rings of the first pair and the journals of the outer gimbal and in the outer gimbal openings receiving the outer rings of the second pair and between the outer ring flanges of the second pair and the surface of said outer gimbal around its openings and between the inner rings of the second pair and the journals of said inner gimbal, positioning said housing and said inner gimbal in precise alignment with a first axis, positioning the bearings of said first pair precisely at and in precise axial alignment with a second axis perpendicular to said first axis, positioning the bearings of said second pair precisely at and in precise angular alignment with a third axis perpendicular to and coplanar with said second axis and curing said bonding agent while said housing and inner gimbal and bearings are so positioned.

17. A method as in claim 16 in which each of said steps of positioning said bearings comprises applying inwardly directed loading forces to the inner rings of the bearings of each pair.

18. A method as in claim 16 in which said bearing positioning steps comprise supporting said housing on a surface at a location below said bearings, and precisely locating the bearings of each pair at the same predetermined distance above said location.

19. A method as in claim 16 in which said bearing positioning steps comprise supporting said housing on a surface at a location below said bearings, precisely locating the bearings of each pair at the same predetermined distance above said location and applying inwardly directed loading forces to the inner rings of the bearings of each pair, said forces being directed along the respective second and third axes.

References Cited

UNITED STATES PATENTS

| | | | |
|---|---|---|---|
| 3,172,197 | 3/1965 | Rutledge | 29—148.4AX |
| 3,249,986 | 5/1966 | Adkins | 29—149.5 |

THOMAS H. EAGER, Primary Examiner

U.S. Cl. X.R.

29—149.5, 201; 248—179